Patented Feb. 6, 1951

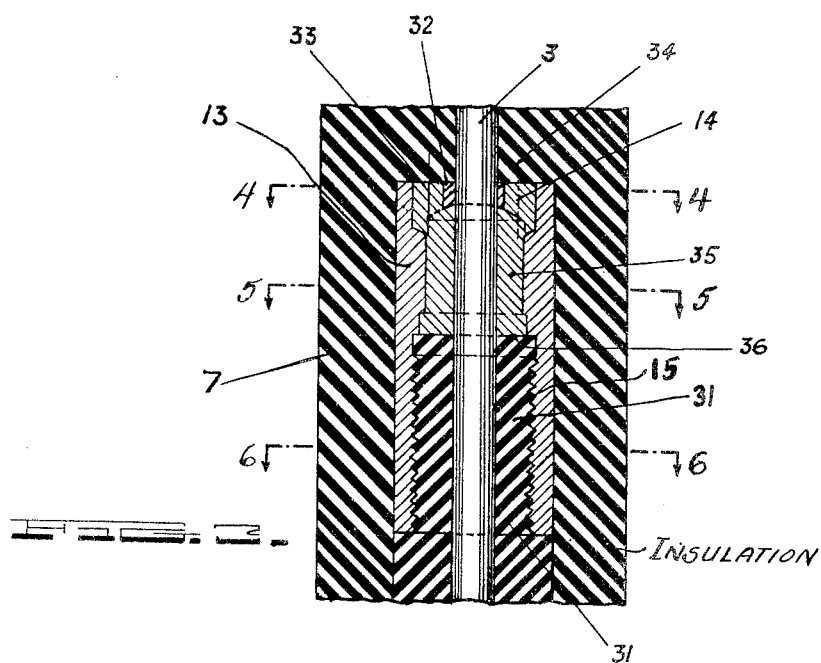
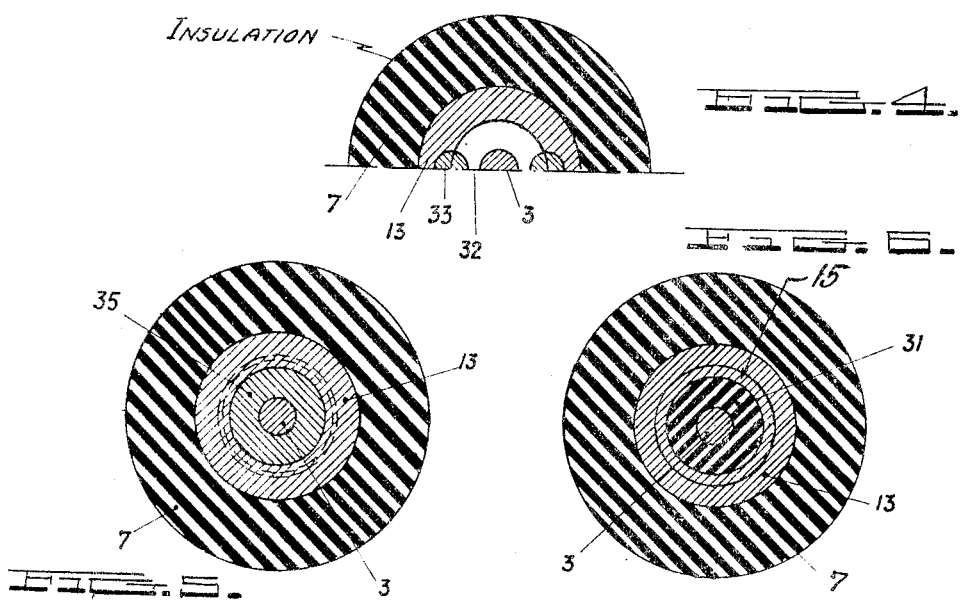

2,540,909

UNITED STATES PATENT OFFICE 2,540,909

INSULATING HEAD FOR ELECTRIC CABLES UNDER HIGH PRESSURE

Georges Pouzet, Paris, France, assignor to Compagnie Generale d'Electricite, Paris, France, a corporation of France Application March 16, 1946, Serial No. 654,988
In France April 3, 1942

Section 1, Public Law 690, August 8, 1946
Patent expires April 3, 1962

7 Claims. (Cl. 174—20)

An isolating head for an electric cable subjected to high fluid pressures has to provide for the passage of the cable from the ambient medium or zone where the high fluid pressure is present to another ambient medium or zone where a pressure lower than the first heavy fluid pressure prevails, for instance the atmospheric pressure, and at this passage it must secure tightness of the joint against the fluid pressure, and the continuity of the insulation characteristics along a length of the cable under changing ambient conditions.

Such a requirement is met, for instance, when a closed connection box is applied to a submarine cable which is laid deep, so that the portion of the cable outside the box is subjected to very heavy pressure, while the portion of the cable within the box is submitted only to a relatively low pressure which is substantially atmospheric pressure.

The simple expedient of a stuffing box pressed between the insulation of the cable and an outer sleeve is not applicable when the relative pressure of the fluid attains a high value, as in the case of a submarine cable, because the mechanical resistance of the insulation of the cable would be insufficient under the impact of the stuffing box.

The present invention provides a simple solution of the two problems of tightness and of the continuity of the insulation characteristics from one ambient medium or zone to the other along a length of the cable under changing ambient conditions.

Its object is to provide an isolating head for an electric cable subjected to high fluid pressures the tightness of which is brought about by a combined action of a joint applied to the insulation of the cable, and of a pressure resisting cap, characterised in that the joint consists of a series of annular pieces of an appropriate form, deformable under the action of the pressure and completed by one or more joints providing tightness, and in that the continuity of the insulation characteristics upon the passage from the ambient zone or medium under high pressure to the ambient zone or medium under low pressure is secured by an insulating bushing terminal embracing the cable tightly and fitting in the pressure resisting cap.

The accompanying drawing shows an embodiment of the invention by way of example only.

Fig. 3 shows on a larger scale the details of the ferrule and adjacent parts;

Figs. 4, 5, 6 are sections taken respectively on the lines 4—4, 5—5, 6—6, of Fig. 3.

Figure 1:
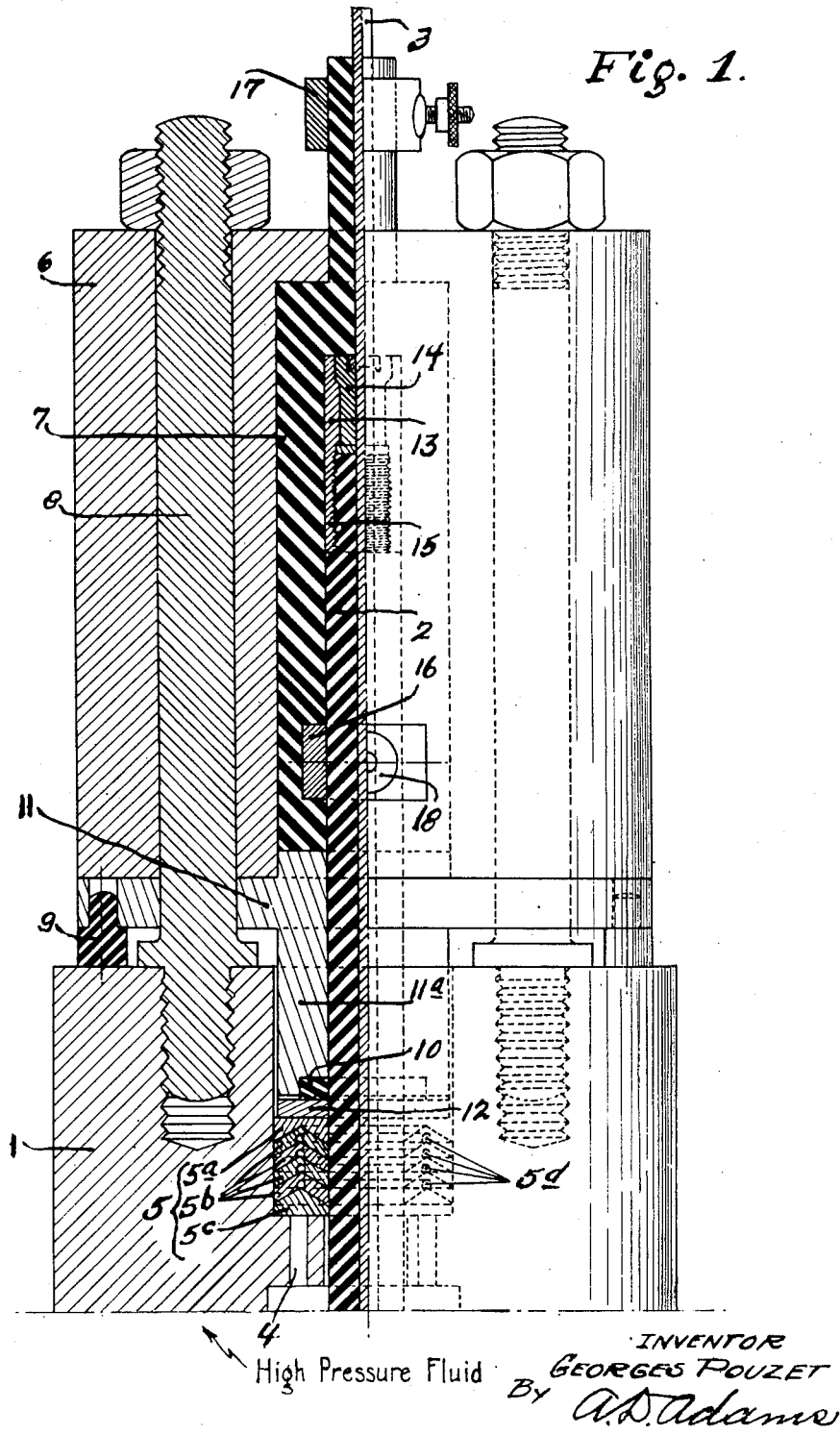
Fig. 1 shows a view of an isolating head partly in section.

In Figure 1, there is shown at 1 the wall of a sleeve traversed by the cable which separates the fluid under high pressure from the other ambient medium or zone where the low pressure is present. 2 represents the cable covered with its insulation. 3 represents the conductor of the cable.

Tightness against the high pressure fluid is automatically achieved by the effect of the pressure acting from bottom to top through the holes 4, partly by a deformable joint 5 simultaneously acting on the wall 1 of the sleeve and on the insulation of the cable 2, and partly by a cap 6 of a pressure resisting material. The joint 5 consists of a series of annular pieces, such as 5a, 5b, 5c. The pieces 5a and 5c are support pieces for the intermediate deformable pieces 5b which expand under the action of the pressure, this expansion being assisted by annular grooves, such as 5a. The cap 6 is fixed on the wall 1 of the sleeve by bolts 8 sufficiently strong to take up the pressure of the fluid, or by any other means. The position of the cap 6 with regard to the wall of the sleeve is determined by the height of abutments 9, suitably designed for preventing the pressing of the joint 5 when assembling and thus avoiding a deformation of the insulation of the cable before it is taken up by the pressure of the high pressure fluid.

According to the present invention the contraction of the portion of the insulation of the cable which the joint 5 bears against under the action of the pressure tending to push the insulation upwards as shown in the drawing is actively prevented by the insulating bushing terminal 7 which surrounds the cable tightly; this bushing terminal 7 enables the insulation to be continued until the atmospheric pressure is reached by prolonging the insulation of the cable. It fits in the cap 6 in such a manner that it is itself practically protected from the mechanical forces resulting either from the action of the pressure of the fluid or from the putting in place of the head.

According to another feature of the present invention the terminal insulating bushing 7 and the aperture through which the cable passes are thoroughly protected from accidental effects of the pressure fluid when pressure is applied by a joint 10 of a non-hygroscopic, elastic material, maintaining the tightness on the lower part on which the pressure fluid can only operate after expansion after the pressure available has been reduced to a pressure near atmospheric pressure. For this purpose a certain play of the outer part of intermediate piece 11 situated at the lower end of the cap 6 must be provided with respect to the metal intermediate washer 12 on the one hand, and with respect to the wall of the sleeve 1 on the other hand, in order to enable the atmospheric pressure to adjust itself about the elastic guarding joint 10. As shown, the intermediate piece 11 has a restricted collar portion 11a fitting within a closely fitting bore in wall unit 1. For the same reason it is advantageous to flute the faces in contact with the pieces 11 and 12 radially, or, preferably, to replace the metal washer 12 by two pieces of the same total thickness, these two pieces having their radially fluted faces in contact.

The passage between the wall 1 and the intermediate piece 11 may likewise be equipped with a joint providing tightness similar to the joint 10. In this case the intermediate piece 11 is exactly adjusted in the wall 1. A channel traversing the intermediate piece 11 and connecting the medium under atmospheric pressure with the lower face of the intermediate piece 11 enables the atmospheric pressure to adjust itself about the joints providing the tightness.

If cables are used which contain a material which can flow away at the ends under the effect of the pressure acting on the exterior of the cable, it is necessary at the end to close the space between the conductor and the insulation in such a manner as to prevent the material capable of flowing away from flowing towards the ends of the insulating head. This is for instance the case with a submarine telephone cable loaded with magnetic material and immersed in a viscous composition acting as a pressure equalizer. For this purpose and according to another feature of the invention, a special metal ferrule 13 is mounted on the inner face of the insulating bushing terminal 7. Tightness on the side of the conductor is secured by soldering the ferrule on the conductor as represented at 14, and on the side of the insulation by a strong pressure of the insulation on the fluted inner surface 15 of the ferrule 13 under the effect of the pressure acting on the lower part of the cable.

The device according to the present invention can be used for the interposition in submarine cables of pick-ups or repeaters, or other transducers situated at a certain depth or on the bottom of the sea, for instance boxes of microphonic marking buoys.

The device may also be used for the connection of two submarine cable portions, whether directly by a junction box, or through a transducer unit, such as a loading coil, a repeater, or other device, situated at a certain depth or on the bottom of the sea.

Figure 2:
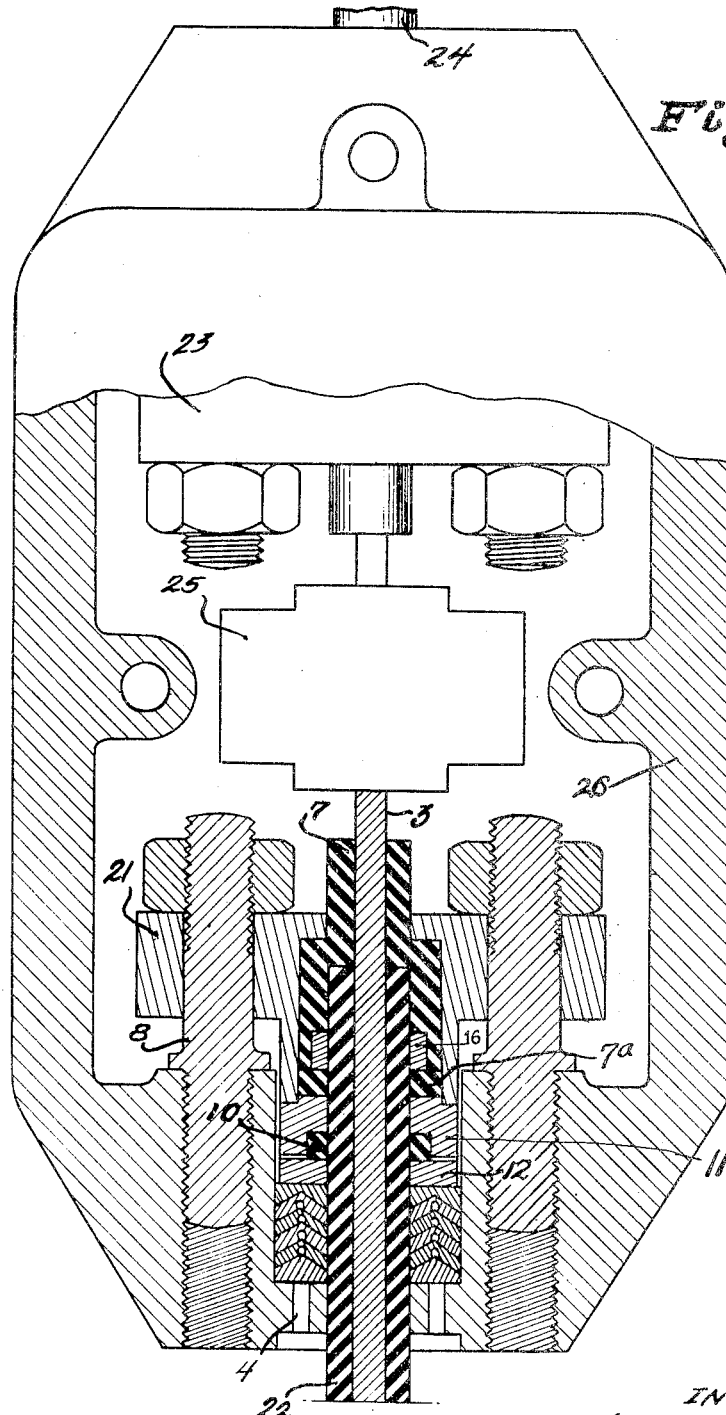
Fig. 2 shows a view partly in section of a junction box of two submarine cable ends enclosing an auxiliary apparatus as a repeater and provided with an isolating head according to Fig. 1.

Fig. 2 shows how such a device can be constructed.

In this figure, 21 denotes an isolating head according to the present invention mounted on the cable 22, and 23 shows another isolating head according to the present invention, mounted on the cable 24 which is to be connected with the cable 22 through an auxiliary transducer unit 25. The isolating heads 21 and 23 are fixed on the tight, pressure resisting housing 26 in the interior of which the auxiliary unit 25 is situated.

In Fig. 2, the cap 21 and the oppositely hatched part immediately below it correspond to the assembly of the cap 6 and the piece 11 of Fig. 1. The bearing pieces 9 of Fig. 1 have not been shown in Fig. 2. Although the employment of the bearing pieces 9 is desirable for the adjustment of the apparatus, it is not necessary that the bearing pieces should constitute a permanent integral part of it and they can be replaced by temporary separators which are removed after adjustment has been made. The base of the element 21 of Fig. 2 is received with some play in the corresponding recess of the tight housing 26.

The insulating bushing terminal of Fig. 2, is in two pieces 7 and 7a to facilitate the putting into place of the guard ring 16. In the case of Fig. 2, this guard ring 16 can be used to measure with precision the insulation resistance of the two cables 22 and 24 after the mounting of the end terminal, and before or after the putting into position of the transducer unit 25, according as the measurement is applied individually to each one of the two cables, or to both of them together. The use of the guard ring 16 mounted in each end permits the verifying by difference measurement the insulation resistance of the arrangement by omitting or introducing the guard ring 16 in the course of the measurements. In Fig. 2, the lower part of the threaded holes for the passage of the holding bolts 8 is sealed by some suitable sealing material, for example, solder, to assure tightness, and is applied at the end of the assembling operation. The tight housing 26 of Fig. 2 corresponds generally to the wall 1 of Fig. 1.

In Fig. 3, 31 is the regular insulation of the cable itself, which is cut off at a face 36. The upper end of hollow ferrule 13, which fits against the inner face of the cross bridge portion 34 of bushing 7, has a central axial circular aperture through which passes the conductor 3 of the cable, and is also provided with two small eccentric circular apertures 33 extending through the upper end of ferrule 13 to its hollow interior through which solder 14 can be poured to form a mass of solder 35 in tight soldered engagement with conductor 3 and abutting terminal face 36 of the cable insulation and the inner cylindrical wall of ferrule 13. This leaves a solid portion 32 of the upper face of ferrule 13 between conductor 3 and the small apertures 33.

Another interesting application of the invention consists in the measurement of the insulation resistance of cables subjected to the pressure according to a device also illustrated in Fig. 1.

In this case the insulating bushing terminal 7 is completed by two electrical guard rings 16 and 17, consisting of metal rings which at the time of the measurement are connected to the voltage of supply through a galvanometer. The voltage is applied to the interior guard ring 16 by the aid of a conveniently insulated terminal 18 passing through the cap 6 and the insulating bushing terminal 7.

By using for the insulating bushing terminal 7 a synthetic material or another material having high insulating qualities and small dielectric losses at high frequencies, the device enables the measurement of several hundreds of kg./cm.$^2$ of insulating resistances of several hundreds of millions of megohms.

It will be apparent to those skilled in the art that my invention is susceptible of modification to adapt the same to particular applications, and all such modifications which are within the scope of the appended claims I consider to be comprehended within the spirit of my invention.

I claim:

1. In an isolating bushing unit for an insulated electric cable traversing a wall separating a zone of high fluid pressure from a zone of low fluid pressure, a separating wall unit apertured for the passage therethrough of said cable and its insulation, said wall unit being provided with a cylindrical recess extending concentrically with said cable from the low pressure side of said wall unit a fractional part of the thickness of said wall unit, a high pressure resistant cap, means for fixedly mounting said cap on the low pressure side of said wall unit and surrounding said cable, the top of said cap being apertured for the passage of said cable therethrough, an intermediate plate member interposed between said wall unit and said cap and having a collar adapted to tightly fit into said recess and being centrally apertured for the passage of the cable therethrough, said cap being provided with a central bore surrounding said cable and which is closed at one end by said intermediate member, an insulating bushing fitting in said bore surrounding said cable and having a portion projecting through the top of said cap to the zone of low fluid pressure, a deformable pressure unit fitting into said recess in said wall unit between the inner face of said recess and the end of said collar, and passages extending from the inner face of said recess to the outer face of said wall unit which is exposed to the high fluid pressure.

2. A bushing unit according to claim 1, and a metal washer and an elastic pressure member interposed between said deformable pressure unit and the end of said collar.

3. A bushing unit according to claim 1, said pressure unit having annular V-shape deformable disc members, and mounting bearing terminal pieces which have at least one flat face and between which said disc members are mounted.

4. A bushing unit according to claim 1, and being adapted for use with a cable containing a viscous insulating compound, the insulation of the cable being terminated at an intermediate point in said cap, said bushing having a shoulder tightly fitting around the so bared conductor of said cable spaced from said intermediate point, and a hollowed ferrule with inner fluted surface extending inside said bushing in the space between said shoulder and said intermediate point along said conductor and being held between said shoulder of said bushing and the terminating face of the insulation of said cable for retaining said insulation in place on said cable.

5. In a submarine cable connecting box unit, a closed box adapted to withstand high external pressure when its internal pressure is low, a pair of cable ends to be connected, the end walls of said box being apertured for the passage therethrough of said cable ends with their insulation and respectively receiving the same in tight engagement, electrical connecting means mounted within said box and connecting together the conductors of said cable ends, and a pair of isolating bushing units positioned respectively adjacent the apertures in the end walls of said box respectively receiving said cable ends in tight engagement, each said end wall being provided with a cylindrical recess extending concentrically with said cable from the low pressure side of said wall a fractional part of the thickness of said wall, a high pressure resistant cap, means for fixedly mounting said cap on the low pressure side of each said wall and surrounding said cable, the top of said cap being apertured for the passage of said cable therethrough, an intermediate plate member interposed between each said wall and said cap and having a collar adapted to tightly fit into said recess and being centrally apertured for the passage of the cable therethrough, said cap being provided with a central bore surrounding said cable and which is closed at one end by said intermediate member, an insulating bushing fitting in said bore surrounding said cable and having a portion projecting through the top of said cap to the zone of low fluid pressure, a deformable pressure unit fitting into said recess in each said wall between the inner face of said recess and the end of said collar, and passages extending from the inner face of said recess to the outer face of each said wall which is exposed to the high fluid pressure.

6. A connecting box unit according to claim 5, said electrical connecting means comprising an electrical transducer for acting on the current applied thereto.

7. A connecting box unit according to claim 5, each said bushing unit further comprising a metal washer and an elastic pressure member interposed between said deformable pressure unit and the end of said cable, said pressure unit having annular V-shape deformable disc members and mounting terminal pieces having at least one flat face and between which said disc members are mounted.

GEORGES POUZET.

REFERENCES CITED

The following references are of record in the file of this patent:

UNITED STATES PATENTS

| Number | Name | Date |
| --- | --- | --- |
| 1,588,804 | Parrish | June 15, 1926 |
| 2,165,323 | White | July 11, 1939 |
| 2,356,351 | Phillips | Aug. 22, 1944 |